US011582346B2

(12) United States Patent
Kadakia et al.

(10) Patent No.: US 11,582,346 B2
(45) Date of Patent: *Feb. 14, 2023

(54) SYSTEM AND METHOD FOR PROVIDING CONTEXTUAL ASSISTANCE FOR CONTACT CENTER APPLICATIONS

(71) Applicant: UiPath, Inc., New York, NY (US)

(72) Inventors: Palak Kadakia, Redmond, WA (US); Anastasia Paushkina, Redmond, WA (US); Wei Si, Palo Alto, CA (US); Sankara Narayanan K. Venkataraman, Bengaluru (IN); Justin Marks, Redmond, WA (US)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,734

(22) Filed: Jun. 28, 2021

(65) Prior Publication Data
US 2021/0329128 A1 Oct. 21, 2021

Related U.S. Application Data

(63) Continuation of application No. 16/781,138, filed on Feb. 4, 2020, now Pat. No. 11,082,561.

(30) Foreign Application Priority Data

Dec. 13, 2019 (IN) .............................. 201911051665

(51) Int. Cl.
H04M 3/51 (2006.01)
H04M 3/523 (2006.01)

(52) U.S. Cl.
CPC ....... H04M 3/5183 (2013.01); H04M 3/5231 (2013.01)

(58) Field of Classification Search
CPC .......................... H04M 3/5183; H04M 3/5231
(Continued)

(56) References Cited

U.S. PATENT DOCUMENTS 8,583,466 B2 11/2013 Margulies et al.
9,459,764 B1 10/2016 Rosner
(Continued)

FOREIGN PATENT DOCUMENTS

CN 109067819 A 12/2018
EP 2240930 A2 10/2010
WO 2021112939 A1 6/2021

OTHER PUBLICATIONS

"NEVA—NICE Employee Virtual Attendant," Jun. 4, 2018, retrieved from https://www.nice.com/websites/RPA/neva/, 11 pgs.
(Continued)

Primary Examiner — Thjuan K Addy
(74) Attorney, Agent, or Firm — Chiesa Shahinian & Giantomasi PC

(57) ABSTRACT

A system and method provide an automation solution for guiding a contact center agent during a communication session by providing contextual in-line assistance. Robotic process automation (RPA) is used for automating workflows and processes with robots that capture information from multiple applications of a contact center system and generate contextual guidance for the contact center agent via callout activities during the communication session.

20 Claims, 11 Drawing Sheets

(58) Field of Classification Search
USPC ..... 379/265.09, 265.05, 265.11, 265.01, 242
See application file for complete search history.

(56) References Cited

U.S. PATENT DOCUMENTS

| | | |
|---|---|---|
| 9,569,231 B2 | 2/2017 | Butin et al. |
| 10,021,245 B1 | 7/2018 | Koster et al. |
| 10,171,656 B2 | 1/2019 | Pullamplavil et al. |
| 2005/0147054 A1 | 7/2005 | Loo et al. |
| 2018/0054523 A1 | 2/2018 | Zhang et al. |
| 2018/0359132 A1 | 12/2018 | Salameh et al. |
| 2018/0370033 A1 | 12/2018 | Geffen et al. |
| 2019/0050206 A1 | 2/2019 | Cavalcante |
| 2019/0180746 A1* | 6/2019 | Diwan .................. G06F 40/279 |
| 2020/0065334 A1 | 2/2020 | Rodriguez et al. |
| 2020/0233707 A1 | 7/2020 | Ramamurthy et al. |
| 2021/0006656 A1* | 1/2021 | Gramacho .......... H04M 3/5191 |

OTHER PUBLICATIONS

"Make Automation Personal," NICE NEVA Brochure, retrieved on Jan. 30, 2020 from https://www.nice.com/rpa/assets/NICE_NEVA_Brochure.pdf, 4 pgs.

YouTube Video, "Introducing NEVA—NICE Employee Virtual Attendant," Jun. 4, 2018, https://www.youtube.com/watch?v=RIEr6u_Sqk, 3 pgs.

Pega, "Robotic Process Automation Done Right," retrieved on Jan. 30, 2020, from https://www.pega.com/products/pega-platform/robotic-automation?gloc=9003505.

International Search Report and Written Opinion dated Dec. 18, 2020, in connection with International Patent Application No. PCT/US2020/040019, filed Sep. 9, 2020, 10 pgs.

Office Action received in connection with Chinese Patent Application No. 202080003198.2, filed Dec. 4, 2020, 9 pgs (including translation).

Extended European Search Report dated Jun. 22, 2022 in connection with European Patent Application No. 20804160.8, 9 pgs.

* cited by examiner

FIG. 7

Update Customer Address

Step 3 - Verify New Address

ADDRESS YOU ENTERED:
111 Doe Lane
BELLEVUE, WA
98004

VERIFIED USPS ADDRESS:
111 Doe Lane
BELLEVUE, WA
98004

CONFIRM USPS ADDRESS

GO BACK

804

Update Customer Address

Step 2 - Update Address - STREET ADDRESS

111 DoeLane

APT/SUTE

CITY
BELLEVUE

STATE
WA

ZIPCODE
98004

VERIFY

SYSTEM AND METHOD FOR PROVIDING CONTEXTUAL ASSISTANCE FOR CONTACT CENTER APPLICATIONS

This application is a continuation of U.S. patent application Ser. No. 16/781,138, filed Feb. 4, 2020, which is based upon and claims benefit of priority from Indian Patent Application Serial No. 201911051665, filed Dec. 13, 2019, the disclosures of which are incorporated herein by reference in their entirety.

TECHNICAL FIELD

The present invention relates generally to contact center operations, and more particularly to an automation solution using robotic process automation (RPA) that provides contextual assistance to contact center personnel during a communication session.

BACKGROUND

Many companies and enterprises use call centers or contact centers as a primary means for managing interactions with customers, including various aspects of customer service, technical support, sales and marketing activities, and the like. Robust contact center operations have become ubiquitous and, in many cases, are integrated within a company's customer relationship management (CRM) infrastructure and systems.

An important factor that contributes to overall customer satisfaction is the ease with which a customer is able to interact with a company using the various communication channels that are made available through contact centers for assisting customers with issues, questions or other aspects of customer service. To that end, customers have high expectations regarding the simplicity and speed (e.g., minimal wait time) of contact center interactions and the knowledge and skill of those personnel who staff the contact centers.

Because of the focus on the customer experience, the customer service technology ecosystem has grown increasingly more complex over time. FIG. 1 depicts the complexity of today's contact center operations, which can take the form of various models 110, providing numerous different services 115, and offering a multitude of communication channels 120. Providing high quality, efficient and timely service in a contact center is especially challenging because contact center agents typically must be knowledgeable and adept at managing non-consolidated customer service toolkits without effective cross-channel services in their daily activities. The complexity and number of non-integrated, scattered systems and applications holding a customer's transactional data and history, coupled with the need to manage multiple communication channels, make it very difficult to maintain a consistent process and deliver a high quality experience for customers.

For example, contact centers typically require the use of, and navigation across, multiple systems, applications and/or platforms. Rarely are such contact center solutions provided by a single vendor, but rather are typically sourced by multiple vendors. As such, contact center personnel, e.g., a contact center agent (CCA), must often toggle between multiple screens and interfaces when dealing with customer service issues. Using a simplified example of a customer call reaching a service agent, the first step usually involves asking the customer for initial information so that associated transaction or order information can be retrieved from the systems. This first step often presents a service challenge to the service agent. While speaking with the customer, the agent must jump from one system (to retrieve basic customer profile information) to another system (for current order status, prior order histories, pending and/or support tickets). As such, these interfaces usually involve managing large amounts of data and user interface elements, which involves a significant amount of time spent on navigating across the disparate systems and applications. In some instances, each interface/operation may involve approximately 20-40 seconds of navigation time and/or information retrieval, which can add significant time for addressing the customer's needs. Furthermore, jumping between disparate channels shifts the focus away from the customer, lowers agent productivity, and potentially endangers data accuracy and regulatory compliance. Not only do these complications result in a lower number of first-call resolutions, they also lead to a decrease in customer satisfaction due to longer handling times, inconsistent communication, and variable experience across channels.

Document-based solutions (e.g., "electronic help" guides) are commonly used in conventional contact center operations to provide agents with some assistance in navigating more efficiently across the various graphical user interfaces (GUIs). These "electronic help" guides are typically organized by categories and/or tasks (e.g., login errors, data exporting, etc.) and provide instructions for using the GUI elements to perform certain tasks. However, document-based "help" solutions are typically cumbersome, incomplete, and can become quickly outdated given the pace with which contact center systems are modified and upgraded. Call scripts are also used as a mechanism for training or guiding a user in navigating the application interfaces in a contact center system. However, call scripts are typically platform-dependent and therefore are not very effective in a contact center system that comprises many different applications, systems and/or platforms.

Although automation of contact center tasks and processes is becoming more common, conventional automation approaches are typically focused in a singular manner to automate processes and tasks within each of the separate and independent systems and applications, e.g., siloed automation. As such, the contact center agent is still burdened with navigating across the disparate systems and applications to synthesize and apply what has been retrieved from the separate automated processes for handling a contact center session with a customer.

SUMMARY

These and other issues are addressed, in accordance with the various embodiments, with an integrated automation solution that provides contextual assistance to contact center personnel for navigating through multiple applications during a communication session with a customer. According to the various embodiments, robotic process automation (RPA) is used for automating workflows and processes with robots that capture information from the multiple applications of a contact center system and generate contextual guidance via callout activities during a communication session.

In an embodiment, a computer-implemented method for providing assistance to a user managing a communication session in a contact center system, wherein the contact center system includes a plurality of applications, comprises: triggering, by a computing system during the communication session, one or more robotic process automation (RPA) workflows; executing the one or more RPA workflows to search the plurality of applications for information relevant to the communication session; and generating and presenting, by the one or more RPA workflows and based on the relevant information, at least one callout activity configured to provide contextual information to the user during the communication session.

Other embodiments include a system and a computer program embodied on a non-transitory computer-readable medium, for providing assistance to a user managing a communication session in a contact center system in accordance with the computer-implemented method described above.

According to some embodiments, the user initiates the triggering of one or more RPA workflows to be executed by one or more attended robots. In other embodiments, one or more RPA workflows may be triggered by the computing system and the one or more RPA workflows are executed by one or more unattended robots. In some embodiments, the at least one callout activity is generated based on analyzing data identified from the search of the plurality of applications and/or by analyzing an activity associated with the communication session. In some embodiments, contextual information includes a contextual recommendation for a next action selectable by the user and/or a contextual instruction for a next action to be taken by the user. In the example of a contextual recommendation, generating and presenting a callout activity comprises presenting the callout activity in a form that includes the contextual recommendation selectable for execution by the user. In the example of a contextual instruction, generating and presenting a callout activity comprises presenting the callout activity in a form that includes the contextual instruction for performing one or more functions. In some embodiments, a plurality of callout activities are generated and presented, which are configured to perform a series of related actions associated with a process. In various embodiments, the callout activity is application-independent and configured to interoperate across the plurality of applications of the contact center system.

According to the embodiments described and claimed herein, RPA-enabled workflows are triggered that utilize robots to retrieve information that resides in multiple disparate systems (front end and/or back end) so that contact center agents can significantly reduce time spent on navigating between various applications and systems during a contact center session with a customer. Contact center agents are provided with contextual assistance, in the form of callout activities generated by the RPA-enabled workflows. This contextual assistance reduces latency and complexity in managing contact center interactions across all communication channels, thereby improving customer satisfaction, employee efficiency and operational profitability.

BRIEF DESCRIPTION OF THE DRAWINGS

FIG. 7 shows an example of an RPA-enabled callout activity according to an embodiment of the invention.

FIGS. 8A, 8B and 8C show exemplary screenshots for a scenario using callout activities in an RPA-enabled workflow according to an illustrative embodiment.

DETAILED DESCRIPTION

Figure 1:
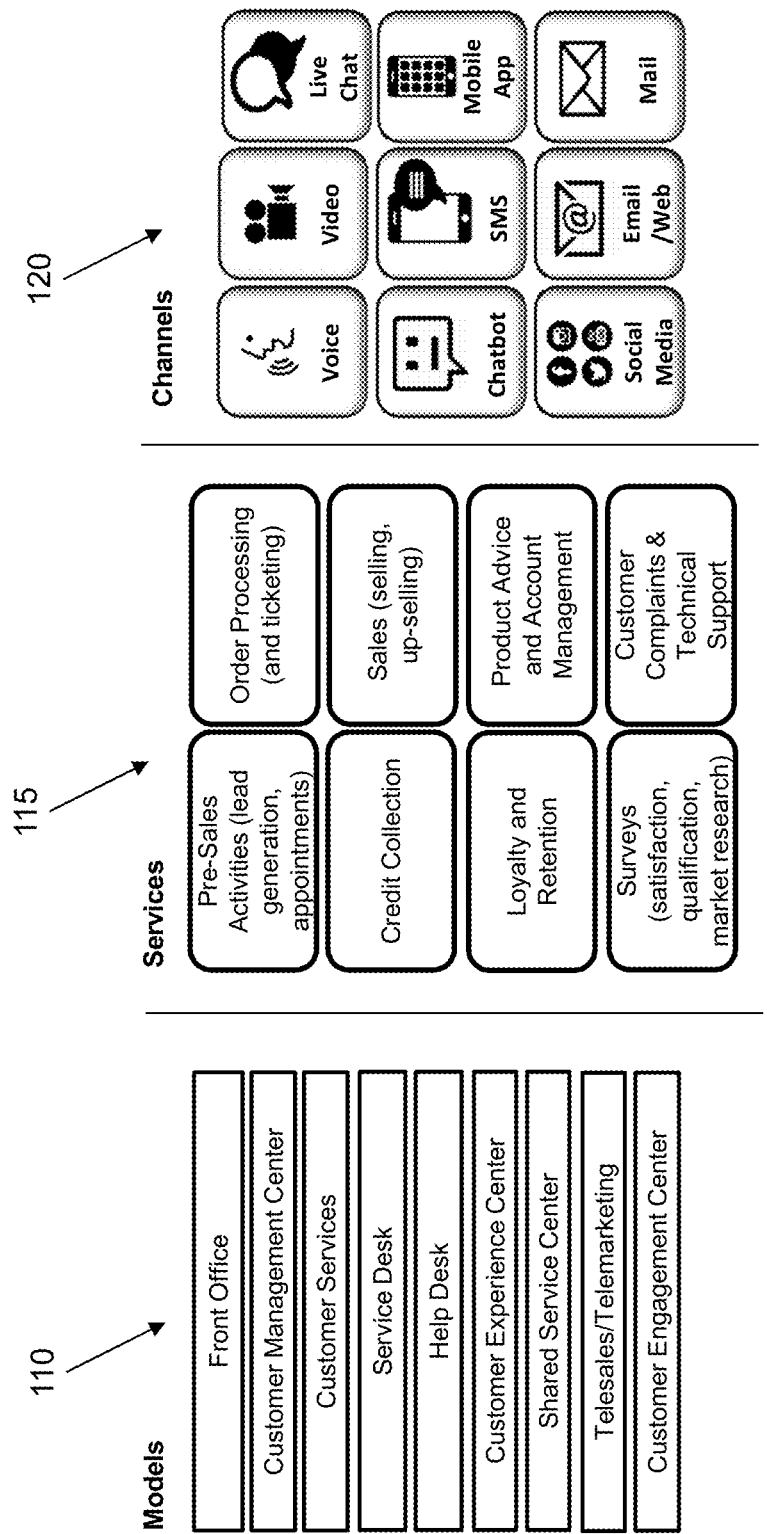
FIG. 1 is a diagram illustrating an exemplary contact center ecosystem.

Various illustrative embodiments will now be described more fully with reference to the accompanying drawings in which some of the illustrative embodiments are shown. It should be understood, however, that there is no intent to limit illustrative embodiments to the particular forms disclosed, but on the contrary, illustrative embodiments are intended to cover all modifications, equivalents, and alternatives falling within the scope of the claims. Where appropriate, like numbers refer to like elements throughout the description of the figures. It will be understood that, although terms such as first, second, etc. may be used herein to describe various elements, these elements should not be limited by these terms. These terms are only used to distinguish one element from another. For example, a first element could be termed a second element, and, similarly, a second element could be termed a first element, without departing from the scope of illustrative embodiments. As used herein, the term "and/or" includes any and all combinations of one or more of the associated listed items.

As used in the context of the various embodiments described and claimed herein, the term "contact center" is used in a generic and non-limiting manner and therefore is intended to include any form of a customer service operation (e.g., contact center, call center, technical support, customer experience, hotline, customer care, and the like). For ease of description, all such operations will be referred to hereinafter using the term "contact center". Furthermore, in the embodiments described and claimed herein, the term 'contact center system" is used in a generic and non-limiting manner and therefore is intended to include any implementation of a contact center product, service, operation, function and so on. For example, a contact center system can encompass implementations that may include various combinations of computer systems/devices, computer/software applications, computer/software platforms, and so on. For ease of description, the term "application" or "applications" will also be used as a generic term to refer to any singular use or combination use of computer systems/devices, computer/software applications, and/or computer/software platforms, any or all of which may be used by contact center agents in performing tasks in or for contact centers. Furthermore, the use of contact center or contact center system is not intended to be limited in any geographical or location-based context. For example, contact centers and contact center systems may have a centralized or distributed architecture, and staffing by contact center agents may also take various forms (local, remote, etc.).

According to the various embodiments described herein, robotic process automation (RPA) is used for automating workflows and processes for contact center operations. In general, RPA is a form of process automation using software robots to automate repetitive and/or labor-intensive tasks to improve productivity of human operators. In an RPA-enabled system, workflows comprising one or more activities are created and then executed by robots, either in an attended mode (e.g., triggered by human agents to assist in completing processes) or in unattended mode (e.g., working independently, such as with back-end system tasks).

Figure 2:
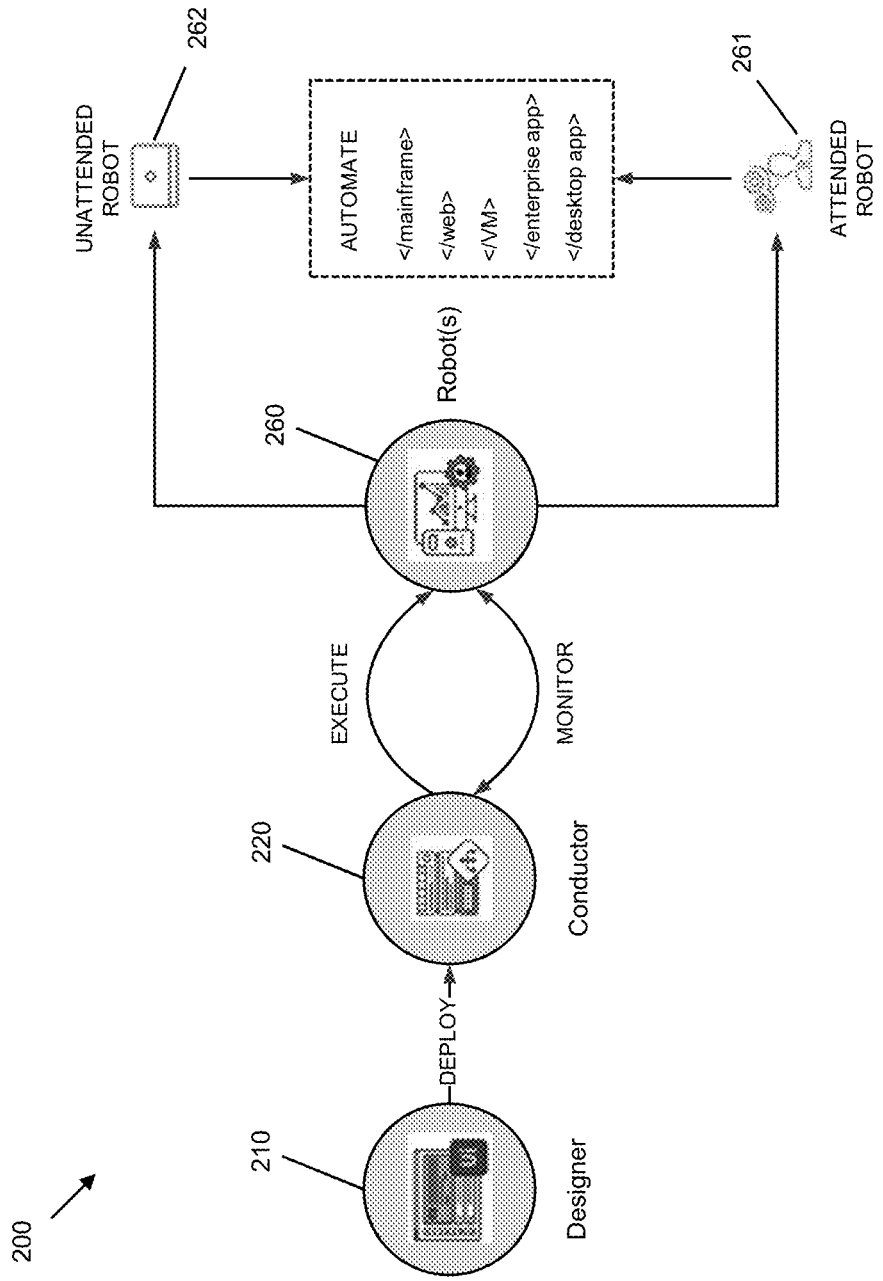
FIG. 2 is an architectural diagram illustrating an RPA system according to an embodiment of the invention.

Exemplary RPA System Architecture. FIG. 2 is an architectural diagram of an RPA system 200 according to an illustrative embodiment. As shown, RPA system 200 includes designer 210 to allow a developer to design automation processes using workflows. More specifically, designer 210 facilitates the development and deployment of workflows and robots for performing activities in the workflows. Designer 210 may provide a solution for application integration, as well as automating third-party applications, administrative Information Technology (IT) tasks, and business processes for contact center operations. One commercial example of an embodiment of designer 210 is UiPath Studio™.

In designing the automation of rule-based processes, the developer controls the execution order and the relationship between a custom set of steps developed in a workflow, defined herein as "activities." Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 260 that execute the workflows developed in designer 210. One commercial example of an embodiment of conductor 220 is UiPath Orchestrator™. Conductor 220 facilitates management of the creation, monitoring, and deployment of resources in an RPA environment. In one example, conductor 220 is a web application. Conductor 220 may also function as an integration point with third-party solutions and applications.

Conductor 220 may manage a fleet of robots 260 by connecting and executing robots 260 from a centralized point. Conductor 220 may have various capabilities including, but not limited to, provisioning, deployment, configuration, queueing, monitoring, logging, and/or providing interconnectivity. Provisioning may include creating and maintenance of connections between robots 260 and conductor 220 (e.g., a web application). Deployment may include assuring the correct delivery of package versions to assigned robots 260 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 220 may provide interconnectivity by acting as the centralized point of communication for third-party solutions and/or applications.

Robots 260 are execution agents that run workflows built in designer 210. One commercial example of some embodiments of robots 260 is UiPath Robots™. Types of robots 260 may include, but are not limited to, attended robots 261 and unattended robots 262. Attended robots 261 are triggered by a user or user events and operate alongside a human user, e.g., a contact center agent, on the same computing system. Attended robots 261 may help the human user accomplish various tasks, and may be triggered directly by the human user and/or by user events. In the case of attended robots, conductor 220 may provide centralized process deployment and a logging medium. In certain embodiments, attended robots 261 can only be started from a "robot tray" or from a command prompt in a web application. Unattended robots 262 operate in an unattended mode in virtual environments and can be used for automating many processes, e.g., for high-volume, back-end processes and so on. Unattended robots 262 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 260 install the Microsoft Windows® Service Control Manager (SCM)-managed service by default. As a result, such robots 260 can open interactive Windows® sessions under the local system account, and have the rights of a Windows® service. In some embodiments, robots 260 can be installed in a user mode with the same rights as the user under which a given robot 260 has been installed.

Robots 260 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 260 are executed). These services are trusted with and manage the credentials for robots 260. A console application is launched by the SCM under the local system. User mode robot services in some embodiments manage and monitor Windows® sessions and act as a proxy between conductor 220 and the execution hosts. User mode robot services may be trusted with and manage the credentials for robots 260. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 3:
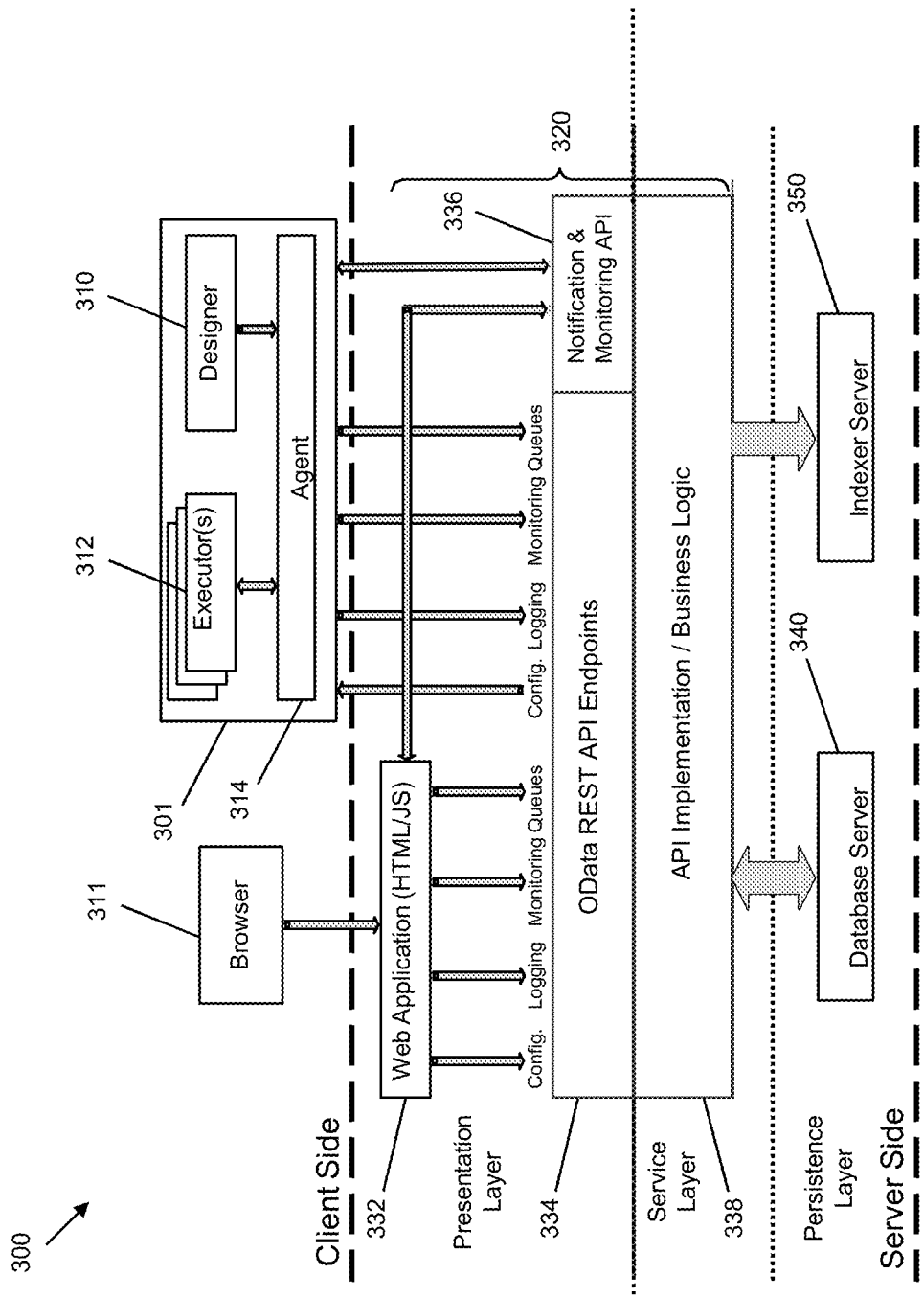
FIG. 3 is an architectural diagram illustrating an example of a deployed RPA system according to an embodiment of the invention.

FIG. 3 shows RPA system 300 according to an illustrative embodiment. RPA system 300 may be, or may be part of, RPA system 200 of FIG. 2. It should be noted that the "client side", the "server side", or both, may include any desired number of computing systems without deviating from the scope of the invention.

As shown on the client side in this embodiment, computing system 301 includes one or more executors 312, agent 314, and designer 310. In other embodiments, designer 310 may not be running on the same computing system 301. An executor 312 (which may be a robot component as described above) runs a process and, in some embodiments, multiple business processes may run simultaneously. In this example, agent 314 (e.g., a Windows® service) is the single point of contact for managing executors 312.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 314 is also responsible for sending the status of the robot (e.g., periodically sending a "heartbeat" message indicating that the robot is still functioning) and downloading the required version of the package to be executed. The communication between agent 314 and conductor 320 is initiated by agent 314 in some embodiments. In the example of a notification scenario, agent 314 may open a WebSocket channel that is later used by conductor 320 to send commands to the robot (e.g., start, stop, etc.).

As shown on the server side in this embodiment, a presentation layer comprises web application 332, Open Data Protocol (OData) Representative State Transfer (REST) Application Programming Interface (API) endpoints 334 and notification and monitoring API 336. A service layer on the server side includes API implementation/business logic 338. A persistence layer on the server side includes database server 340 and indexer server 350. Conductor 320 includes web application 332, OData REST API endpoints 334, notification and monitoring API 336, and API implementation/business logic 338.

In various embodiments, most actions that a user performs in the interface of conductor 320 (e.g., via browser 311) are performed by calling various APIs. Such actions may include, but are not limited to, starting jobs on robots, adding/removing data in queues, scheduling jobs to run unattended, and so on. Web application 332 is the visual layer of the server platform. In this embodiment, web application 332 uses Hypertext Markup Language (HTML) and JavaScript (JS). However, any desired markup languages, script languages, or any other formats may be used without deviating from the scope of the invention. The user interacts with web pages from web application 332 via browser 311 in this embodiment in order to perform various actions to control conductor 320. For instance, the user may create robot groups, assign packages to the robots, analyze logs per robot and/or per process, start and stop robots, etc.

In addition to web application 332, conductor 320 also includes a service layer that exposes OData REST API endpoints 334 (or other endpoints may be implemented without deviating from the scope of the invention). The REST API is consumed by both web application 332 and agent 314. Agent 314 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 320. Queueing REST endpoints may be responsible for queues and queue item management, such as adding data to a queue, obtaining a transaction from the queue, setting the status of a transaction, etc. Monitoring REST endpoints monitor web application 332 and agent 314. Notification and monitoring API 336 may be REST endpoints that are used for registering agent 314, delivering configuration settings to agent 314, and for sending/receiving notifications from the server and agent 314. Notification and monitoring API 336 may also use WebSocket communication in some embodiments.

The persistence layer on the server side includes a pair of servers in this illustrative embodiment—database server 340 (e.g., a SQL server) and indexer server 350. Database server 340 in this embodiment stores the configurations of the robots, robot groups, associated processes, users, roles, schedules, etc. This information is managed through web application 332 in some embodiments. Database server 340 may also manage queues and queue items. In some embodiments, database server 340 may store messages logged by the robots (in addition to or in lieu of indexer server 350). Indexer server 350, which is optional in some embodiments, stores and indexes the information logged by the robots. In certain embodiments, indexer server 350 may be disabled through configuration settings. In some embodiments, indexer server 350 uses ElasticSearch®, which is an open source project full-text search engine. Messages logged by robots (e.g., using activities like log message or write line) may be sent through the logging REST endpoint(s) to indexer server 350, where they are indexed for future utilization.

Figure 4:
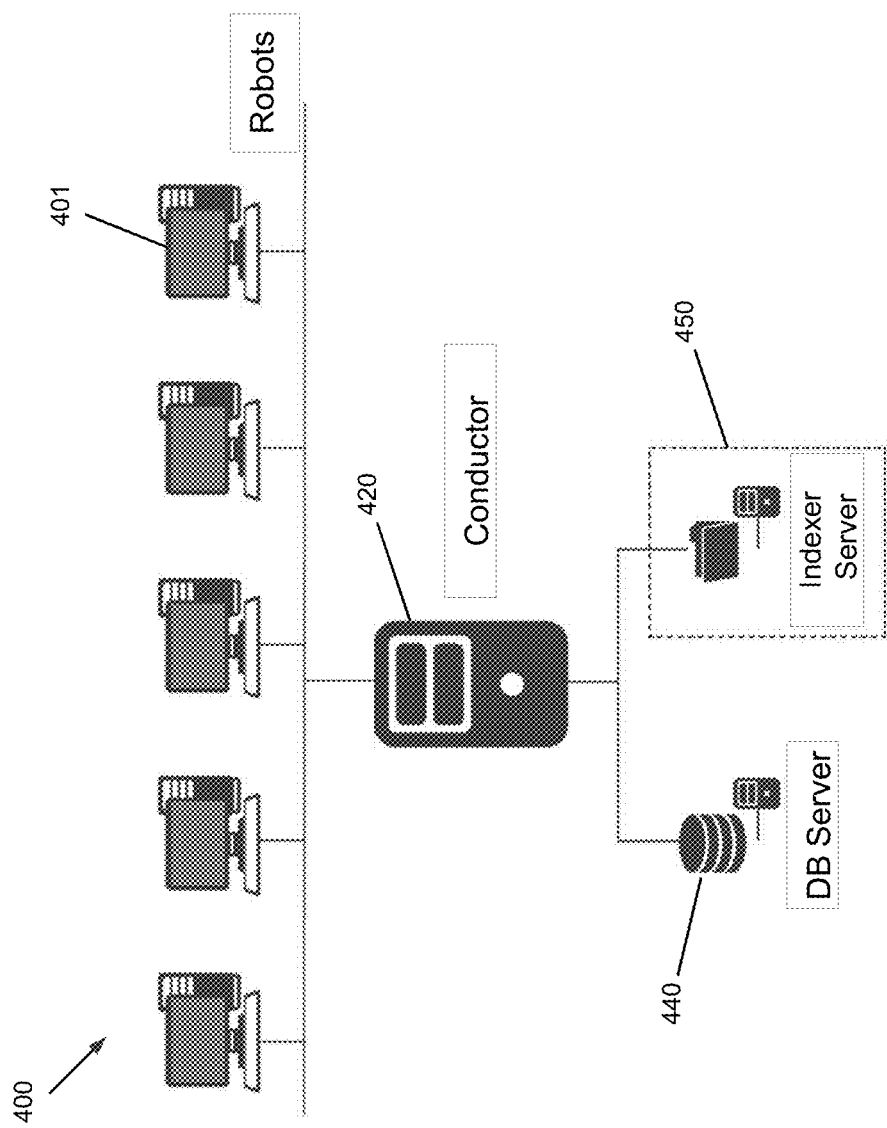
FIG. 4 is an architectural diagram illustrating a simplified deployment example of an RPA system according to an embodiment of the invention.

FIG. 4 is an architectural diagram illustrating a simplified deployment example of RPA system 400 according to an embodiment of the present invention. In some embodiments, RPA system 400 may be, or may include RPA systems 200 and/or 300 of FIGS. 2 and 3. RPA system 400 includes multiple client computing systems 401 running robots. Computing systems 401 are able to communicate with a conductor computing system 420 via a web application running thereon. Conductor computing system 420, in turn, communicates with database server 440 and an optional indexer server 450. With respect to FIGS. 3 and 4, it should be noted that while a web application is used in these embodiments, any suitable client/server software may be used without deviating from the scope of the invention. For instance, the conductor may run a server-side application that communicates with non-web-based client software applications on the client computing systems.

RPA-Enabled Contact Center Solution. According to various embodiments disclosed herein, an integrated RPA-based automation solution provides contextual assistance to contact center personnel (e.g., a contact center agent) for navigating through multiple applications during a communication session with a customer. Workflows are automated and executed by robots to capture information from the multiple applications of a contact center system (including from front-end and/or back-end systems) and generate contextual guidance via callout activities during a contact center session. In many contact center operations, the front-end systems generally include customer relationship management (CRM) and/or enterprise resource planning (ERP) applications used by contact center agents for querying information about the calling customer. Additionally, the front-end may include interactive voice response (IVR) systems that handle incoming calls, knowledge bases to look up and retrieve troubleshooting steps for a given issue, ticket management systems to track customer issues, and so on. The back-end systems and applications in a contact center may include a provisioning system for shipping or configuring products/services for the customer (e.g., for the cable company configuring a modem), billing systems, credit card processing and collection systems, purchasing systems, order tracking, and so on. Some examples of such systems/applications may include, but are not limited to SAP®, Siebel®, mainframe systems, Citrix® virtualized legacy systems, Salesforce®, Microsoft® Excel, ServiceNow®, Twilio®, and various other systems and applications. These examples are meant to be illustrative only and not limiting in any manner.

Figure 5:
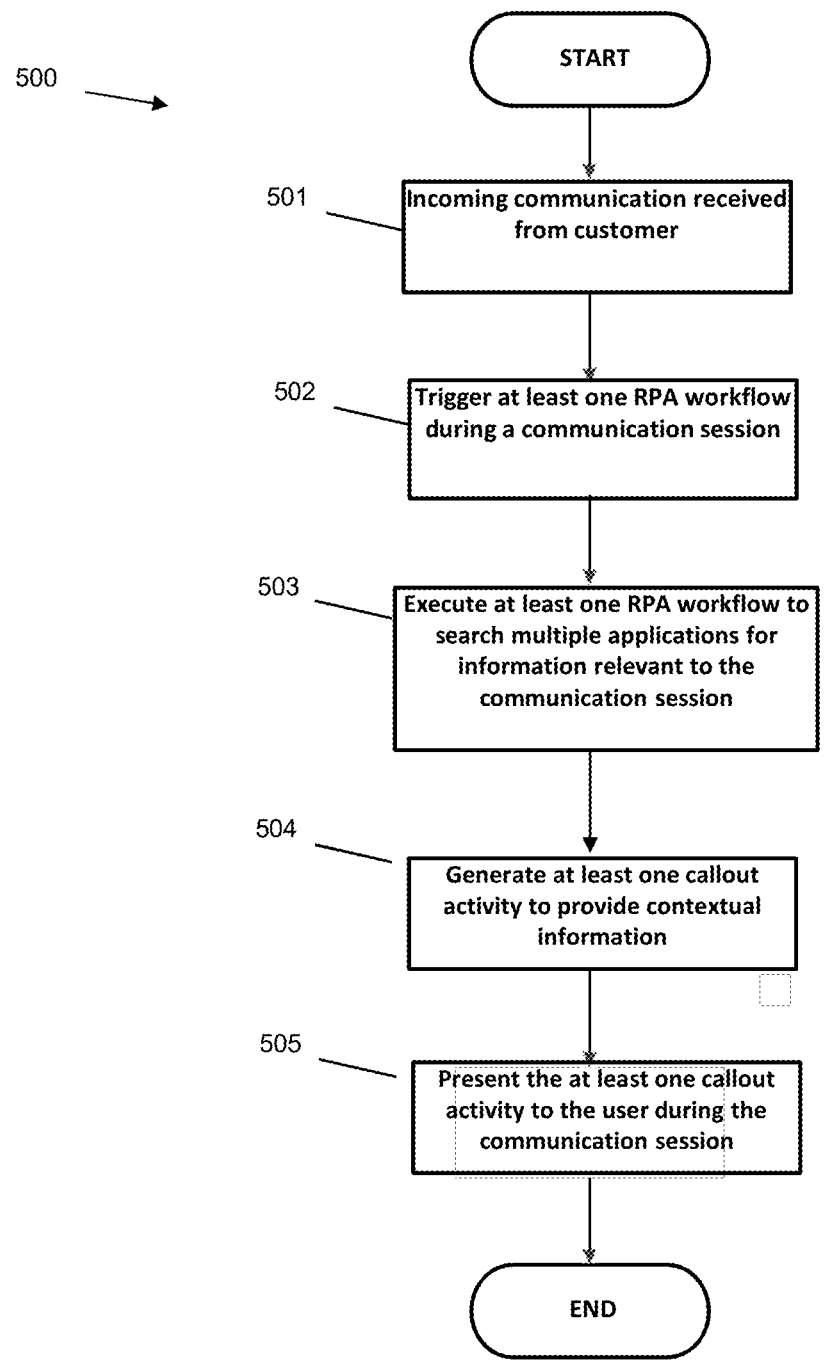
FIG. 5 is a flowchart showing a method according to an embodiment of the invention.

FIG. 5 is a flowchart illustrating a process 500 according to an embodiment of the invention. Referring back to FIG. 3, process 500 may be performed on the client side in an RPA architecture (e.g., by computing system 301 for example). More specifically, process 500 is a method for providing assistance to a user managing a communication session in a contact center system. In one embodiment, the contact center system used by the contact center agent to handle customer calls (or communications through a number of different channels) includes one or more applications and systems that may also be on different platforms. In many scenarios, such applications and systems are disparate, non-integrated and time-consuming to navigate because the contact center agent must not only toggle between these multiple systems and applications, but he or she must also have working-level proficiency and expertise in each of the systems. Even if the contact center agent possesses such proficiency, navigating across the multiple systems is still time consuming (even with document-based "electronic help") and therefore disruptive to both the contact center agent and the customer while the communication session is in progress.

As shown in FIG. 5, the contact center agent receives an incoming communication request from a customer at step 501. Referring back to FIG. 1, such communication requests can occur over a number of different communication channels 120 that are now prevalent in many customer relationship/contact center systems. For example, communication channels 120 may include voice calls (e.g., directly received or redirected from Interactive Voice Response (IVR) systems), live chats, video sessions, emails, online-initiated inquiries, social media channel messaging, SMS messaging, and so on. As such, the contact center agent already is challenged by the multiplicity of communication channels that he or she must service for inbound customer communications.

Upon receipt and acceptance of an inbound customer call, a communication session is established between the contact center agent and the customer. In a typical scenario, depending on the nature of the inquiry or issue to be resolved, the contact center agent would normally have to search for customer information, account information, product information, customer and/or product history information and so on, by toggling between and navigating the aforementioned multiple systems and platforms. This process takes place all while still engaged in the communication session with the customer. Additionally, a contact center agent in a typical scenario would have to be trained on how to use the different systems and when to update them, and so on. As a result, and depending on the complexity of the inbound request, many contact center sessions can be characterized by long wait times, frequent interruptions as the communication session is repeatedly placed on hold, and sporadic success in resolving the issue depending on the skill of the agent and the relevancy and usefulness of the information that he or she is able to locate during the session. According to an embodiment of the invention, at least one RPA workflow is triggered during the communication session to navigate through the multiple applications (front-end and/or back-end) of a contact center system, as shown in step 502.

According to various embodiments, an RPA workflow can be triggered in various ways to invoke robot(s) to assist the contact center agent with navigating across the complex multi-application, multi-platform contact center systems. In one example, the contact center agent can select an automation choice to trigger an attended robot, e.g., select from among one or more candidate automation workflows that have been provided to the agent. For example, one scenario may involve the contact center agent triggering an automated "address update" RPA process. According to the various embodiments, the contact center agent can avoid having to toggle between multiple applications and instead can remain in his/her "home" application while "in-call" with a customer. This automation functionality can be embedded in or can "float" over the contact center application (or applications, screens, controls, etc.) being used by the contact center agent. In one example, a floating guide can be presented to the contact center agent contextually within a workflow to help focus and draw attention to the key task that needs to be performed.

Integrating automation provided by an RPA system into another application (e.g., contact center application) can be achieved in various ways. In one embodiment, the RPA system may provide a JavaScript software development kit (SDK) as well as .NET-based application programming interfaces (APIs) so that developers can integrate the automation technology of the RPA system inside other applications. For example, the RPA system may be embedded into a task pane of Microsoft® Outlook to extract details from an email for processing through an automation, e.g., an RPA-enabled workflow. In another example, RPA-enabled workflows may be integrated directly into an IVR system/application such that a contact center agent can click a button to run an automation in context or, alternatively, have a process initiated to display data in context rather than opening another application. Numerous other examples are contemplated for use in conjunction with the embodiments described herein.

Figure 6:
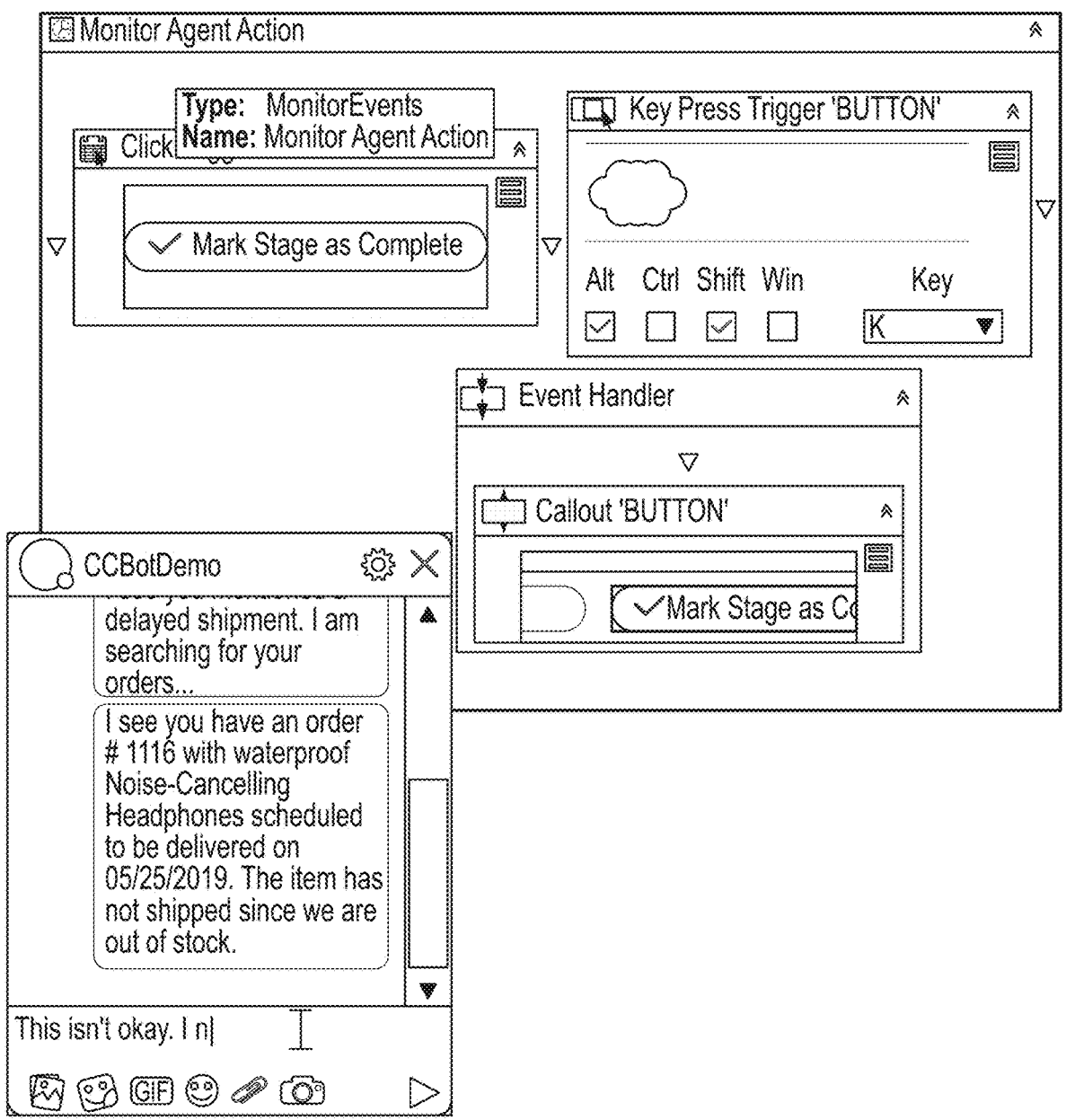
FIG. 6 shows an example of an RPA-enabled trigger according to an embodiment of the invention.

In some embodiments, other actions such as contextual triggers can also be used for robot invocation. For example, event-driven triggers can be used whereby an automated RPA process is launched automatically by a computing system based on user actions such as a "button click", keyboard actions (e.g., including triggers based on shortcut keys), and so on. In another example, text-based triggers can be implemented, e.g., monitoring chatbot conversations and using keywords to trigger an automated process. FIG. 6 shows one illustrative example of how a RPA-enabled trigger 602 can be implemented based on chatbot conversations. In this example, the outcome of the trigger is a callout-based automated workflow that the contact center agent can follow to complete a task. In other embodiments, voice-based triggers could include launching an automated process based on keyword(s) detected during communication sessions.

As described, triggers that are used to launch processes can be implemented in various ways, manually or automatically. A developer authoring a process to be automated generally looks for a scenario to occur (the trigger) and designs a corresponding action or set of reactions to the trigger. While manual triggers may comprise a button click on a mouse, a keyboard stroke or sequence (e.g., CTRL+F2), etc. as described above, automated triggers can include the opening of an application, receipt of an incoming call, and so on. Triggers may also be implemented in a polling operation that monitors for an event or activity, e.g., check inbox every 10 seconds for new emails. As demonstrated by the above examples, various methods for triggering automated processes, e.g., attended or unattended, by the user (e.g., contact center agent) or from other mechanisms, and so on, are contemplated by the teachings herein. The above examples are therefore only illustrative and not intended to be limiting in any manner.

Returning to FIG. 5, one or more RPA workflows are executed at step 503, to search information that is relevant to the communication session. For example, attended robots may be used to navigate the various applications and systems (e.g., front-end and/or back-end systems) to identify relevant information that will assist the contact center agent, in real-time, in servicing the customer's request.

Referring back to the system and architecture shown in FIGS. 2-4, robots are generally initialized upon system boot-up (e.g., robot 260 is a service running on Windows®, etc.). Processes utilizing attended robots (e.g., RPA-enabled workflows) can then be launched in a variety of ways including, for example: (i) manually, by clicking start from the robot tray; (ii) manually via SDK/embedding, by clicking a button in another application, which sends a command to the robot tray to run a process; (iii) automatically via the robot tray, e.g., a process can be marked as auto-start such that it starts whenever the robot tray opens; and (iv) automatically via SDK/embedding, e.g., via a webpage that is coded to initiate a process to retrieve information. For comparison purposes, unattended automation can also be launched in a variety of ways, for example: (i) start a job manually via a conductor (e.g., conductor 220, 320 and 420 in FIGS. 2-4, respectively); (ii) manually by calling an API to start a job; (iii) automatically via a queue, e.g., a job is added to a queue and robots monitor the queue for jobs to execute; (iv) automatically via an API, e.g., a webpage can be coded to initiate a process to get information; and (v) automatically on a schedule. The above examples for launching a process (e.g., an RPA-enabled workflow) are meant to be illustrative and not limiting in any manner.

In step 504, based on the relevant information that is retrieved, the executed RPA workflow(s) generate one or more callout activities to provide contextual information for the contact center agent. In step 505, the callout activities are presented to the contact center agent to further guide the contact center agent in performing tasks that are relevant for addressing the issue, request, etc. in the active communication session. In this manner, the callouts are presented "in-line", e.g., generated and presented substantially in real-time during the communication session, which significantly reduces the navigation and search time associated with conventional techniques.

In some embodiments, the callouts are generated to provide contextual information (e.g., instructions, recommendations, messages, etc.) to the contact center agent based on monitoring and analyzing on-going activity of the communication session. In other embodiments, the callouts are generated based on underlying data that is identified by the RPA-enabled searches across the multiple applications in the contact center system (e.g., front-end and/or back-end applications and systems). In other embodiments any combination of the above approaches can be utilized as a basis for generating the callout activities for the contact center agent.

In some examples, the contextual information may include contextual recommendations, contextual instructions, contextual action messages or any combination thereof. For example, a callout activity may be generated and presented in a form comprising a contextual instruction prompting the contact center agent to perform one or more functions (e.g., for verifying a customer's address). A callout activity may also be generated and presented in a form comprising a contextual recommendation or suggestion for a next action selectable by the contact center agent, and which is then executed based on the user response (e.g., prompting the contact center agent as to whether they want to update the customer's address across other systems). In yet another example, a callout activity may be presented in a form comprising a message informing the contact center agent of completion of one or more actions (e.g., that the customer's address has been changed). These examples are all meant to be illustrative and not limiting in any manner.

According to other embodiments, a plurality of callout activities can be generated (e.g., sequentially) by the RPA-enabled workflows based on relevant information searched by the executed RPA workflows. The plurality of callout activities may be configured to perform a series of related actions associated with a process (e.g., all steps and actions associated with changing a customer's address in all databases across multiple systems and applications, such as updating, verifying, confirming, etc.). In this manner, a series of callouts can be designed to form an end-to-end contextual RPA-enabled solution. Additionally, the contextual RPA-enabled solution can effectively train the contact center agent (on-the-job) during the process, which addresses the aforementioned issues with training contact center agents in the use of multiple systems and applications.

According to the embodiments described herein, callout activities may be configured to interoperate across different applications (e.g., web applications, desktop applications, applications/systems with or without API availability, etc.). For example, callouts can appear across multiple applications because they are not necessarily tied to any single application. In the example of guiding a contact center agent through a customer solution, a single process could be used to launch callouts across multiple applications so that the contact center agent can lookup customer information in a CRM system, check the customer's bill in an ERP application, validate a serial number in a provisioning system, and so on.

The embodiments described herein therefore are capable of providing a unique and effective solution that combines and intersperses automation with guidance. As described, a callout draws attention to a task, and once the user performs that task, another application opens (e.g., using automation), followed by another callout in that second application, and so on.

Figure 7:
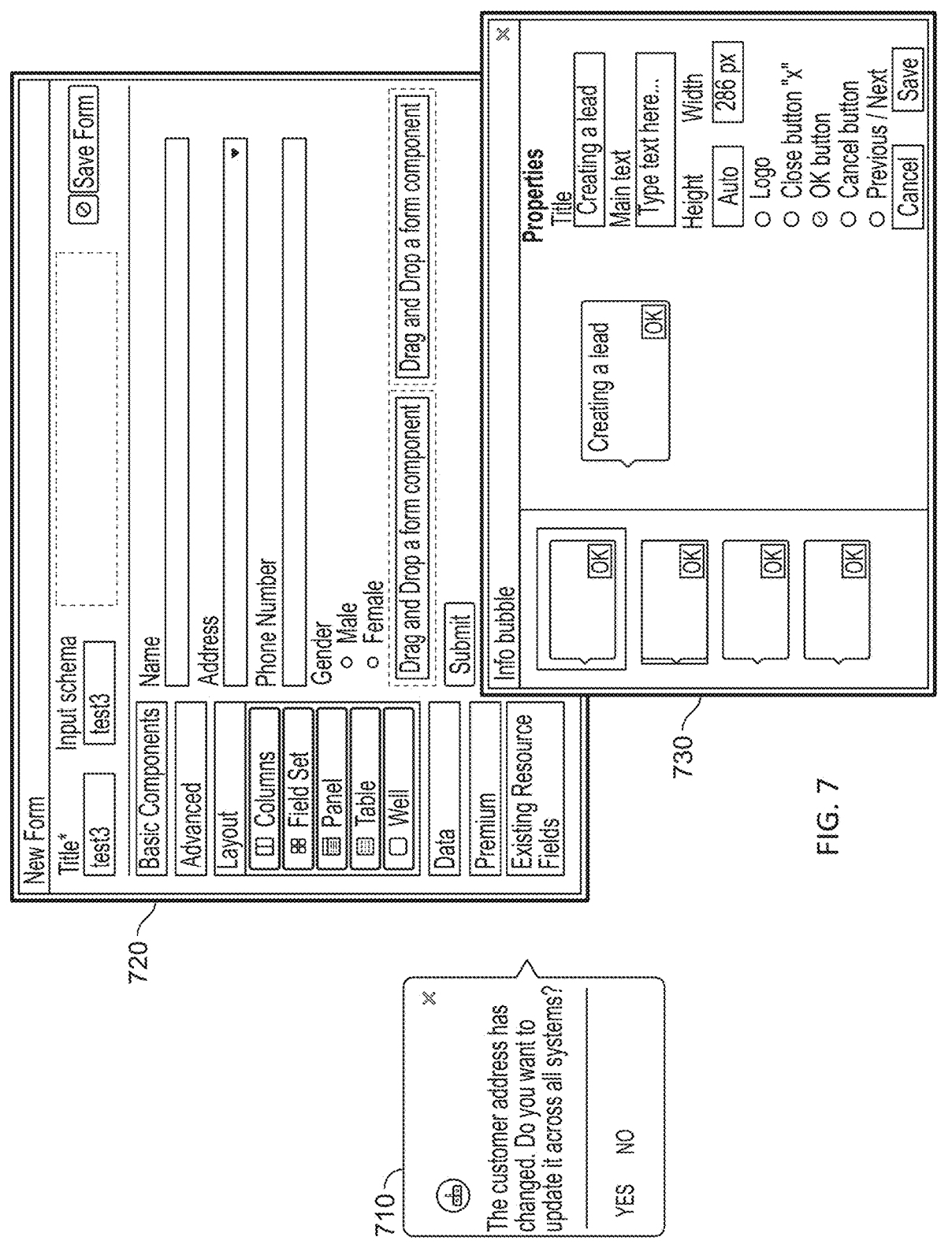

FIG. 7 shows a simplified example of an RPA-enabled callout functionality that may be designed as a message and a contextual recommendation/suggestion for the contact center agent, which can then be further executed based on the user response. In particular, callout 710 is a simplified callout suggestion, generated by an RPA-enabled workflow, prompting the contact center agent about updating an address across all systems. Form element 720 and callout "bubble" template element 730 are examples demonstrating how instructions, recommendations, etc. can be designed for execution by robots in an RPA-enabled workflow. As will be appreciated by one skilled in the art, activities can be designed for creating custom forms for human input/output and/or for capturing and presenting information collected from robots from their search of the multiple, disparate applications of a contact center system.

In one embodiment, adding a callout activity to a process may involve selecting an element (or step, decision point, etc.) where a callout activity should appear. A form could also be designed and associated with the callout activity (e.g., a basic template form for the callout activity, a customizable form, etc.). According to various embodiments, a form to be associated with a callout activity can include various elements that are customizable during the design of the RPA workflow/process. Such elements may include, for example: (i) simple data types such as string, integer, etc. in label-value pairings; (ii) a "close" button for the user to dismiss the callout; and/or (iii) one or more buttons to perform desired actions (e.g., triggering another callout activity, opening a pop-up, invoking an HTML form, triggering other processes, adding an action to a queue, etc.). As described, during development/design of an RPA workflow with callout activities, the designer can choose the element where callout(s) should appear and associate a form to the callout. In some embodiments, a "wizard-type" of function can be used to facilitate the selection and ordering of elements for the form.

Figure 8A:
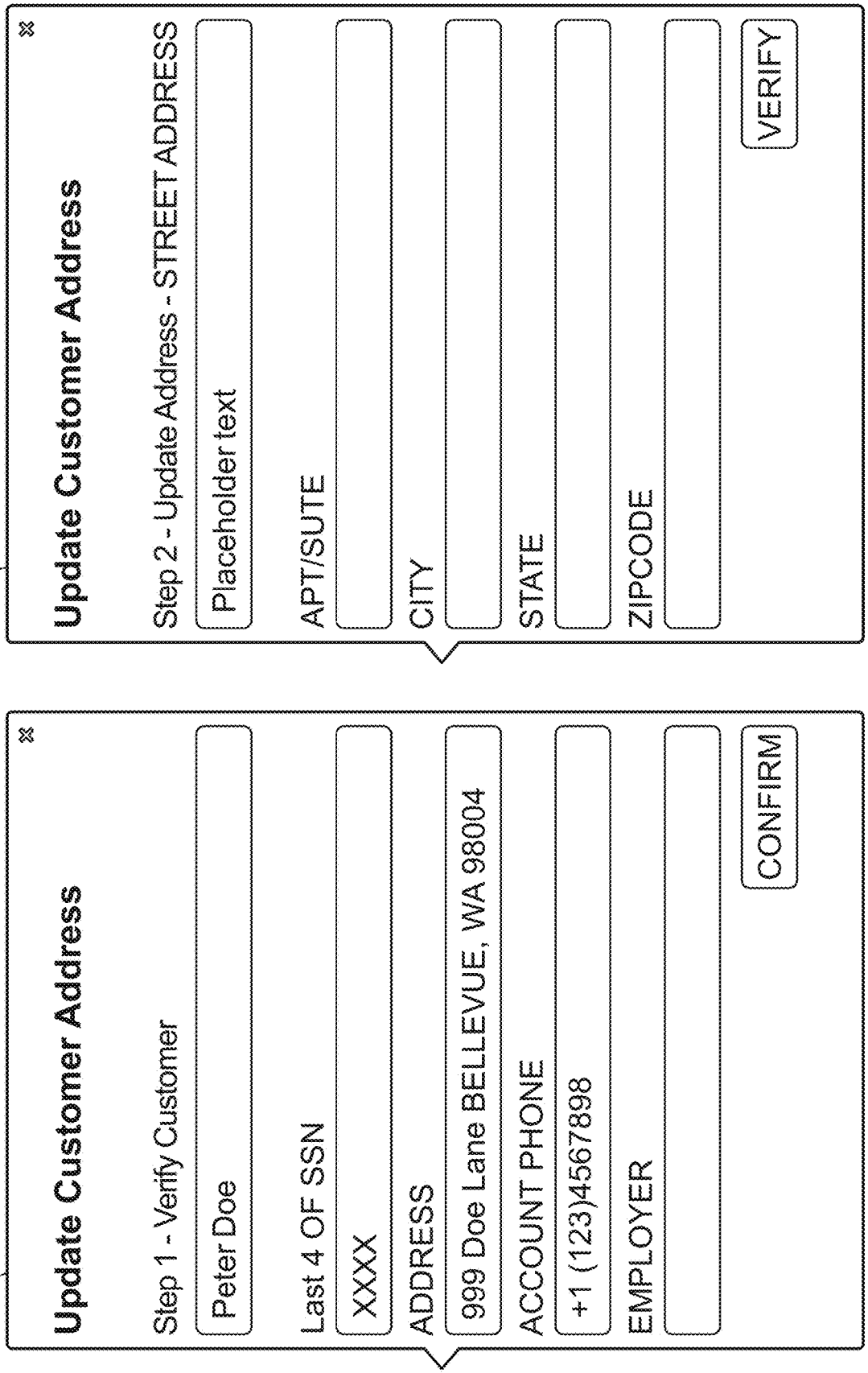
Figure 8C:
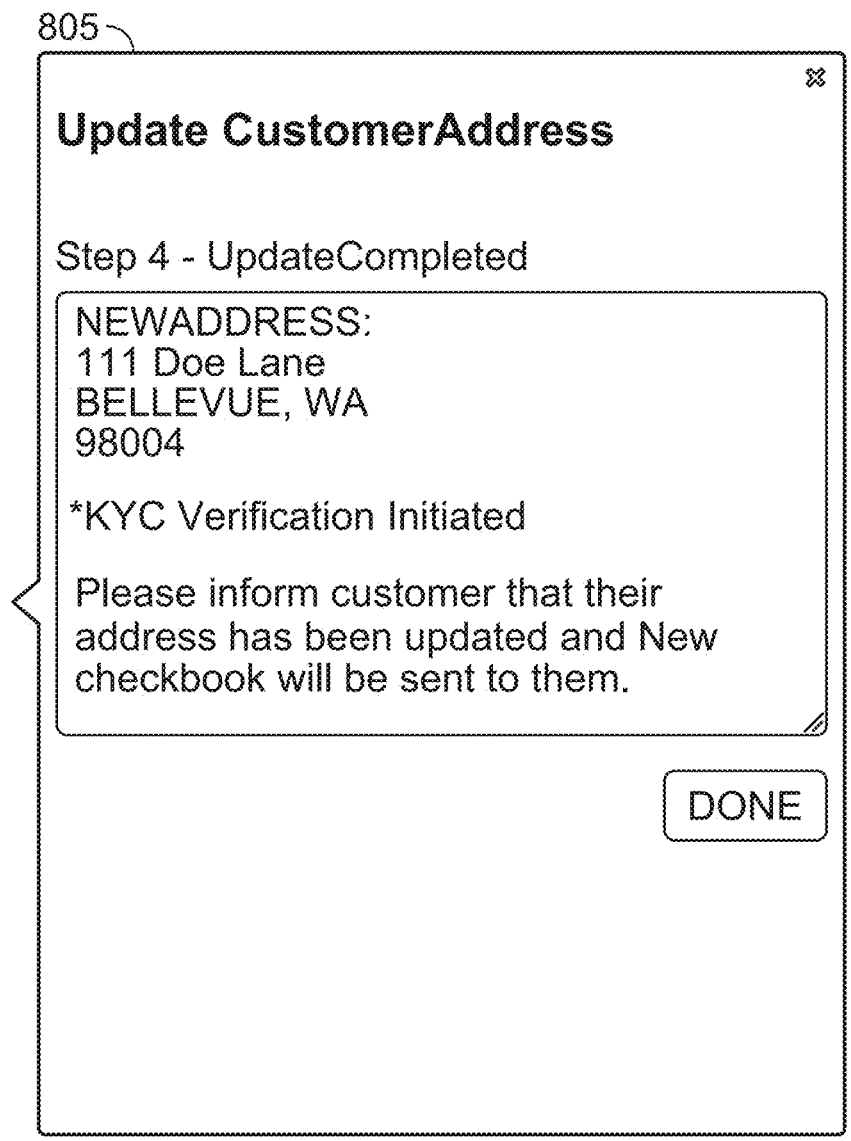

FIGS. 8A, 8B and 8C show an exemplary scenario for the design and use of callout activities in an RPA-enabled workflow according to an illustrative embodiment. As indicated previously, such workflows are created, e.g., by a user/developer using Designer 210 (310) from FIGS. 2 and 3, in this case for a contact center system. Once designed, the automated processes can be deployed and implemented in the contact center system according to the embodiments described for the RPA architecture depicted in FIGS. 2-4. For example, the RPA-enabled workflows can be designed and deployed as automation processes that are selectable by a contact center agent from the main (e.g., "home") application of the contact center system.

The example shown in FIGS. 8A-8C covers a scenario in which a customer initiates a communication with a contact center of a bank to request an address change. A typical address change process may include, for example: verifying customer information; triggering a KYC ("know your customer") check; updating the new address in a bank account, a credit card account and/or a customer relationship management (CRM) system; and issuing a new checkbook to the customer. In conventional arrangements, a contact center system would require a contact center agent to first solicit information from the customer, search the customer record(s) from one or more database files and then verify the customer. The further steps of updating the new address would typically require the contact center agent to separately navigate different applications to implement the updates, e.g., navigating multiple interfaces. All these steps require time and often result in the customer being placed on hold as the contact center agent navigates, searches and performs the update tasks.

According to the embodiments described herein, such a process can be simplified through the use of RPA-enabled automation to capture relevant information and generate callout activities to guide the contact center agent through navigation of the multiple interfaces and applications. FIGS. 8A-8C show exemplary screenshots 801-805 of the callouts and associated forms for automatically prompting, substantially in real-time, the contact center agent in managing an "update address" scenario according to an illustrative embodiment.

For example, after a communication session is established with a customer, the contact center agent may click on an "update address" automation task in the main ("home") application of the contact center system, e.g., on an "activities toolbar" and be presented with an input form in a pop-up window to enter basic customer information (e.g., screenshot 801). Alternatively, such information may be automatically obtained/populated via processes linked to the initiation of the session by the customer (e.g., from an application associated with managing the incoming communications). An attended robot is then triggered to execute one or more RPA workflows, e.g., the attended robot searches for information relevant to the customer, presents additional customer details to the agent (e.g., by populating additional fields in the form shown in screenshot 801) to allow the agent to verify identity of the customer, and presents the agent with a form (e.g., screenshot 802) to prompt the agent to obtain a new address from the customer. Once the agent provides the new address information (e.g., screenshot 803), a robot is triggered to execute an activity to validate the new address (e.g., through the US Postal Service website), which results in the generation and presentation of a callout and associated form to the agent (screenshot 804) with the validation results and a prompt to the agent to confirm the new address with the customer. If there is no error, the robot saves the new address in the front-end system (e.g., main contact center application) and can also update/synchronize the address update through all other applications (e.g., in the back-end systems of the contact center system, etc.) and inform the agent via another callout and associated form with a message that the update has been completed (screenshot 805). If there are errors, the robot may generate and present another callout and form (not shown) with other address recommendations for selection by the agent.

Figure 9:
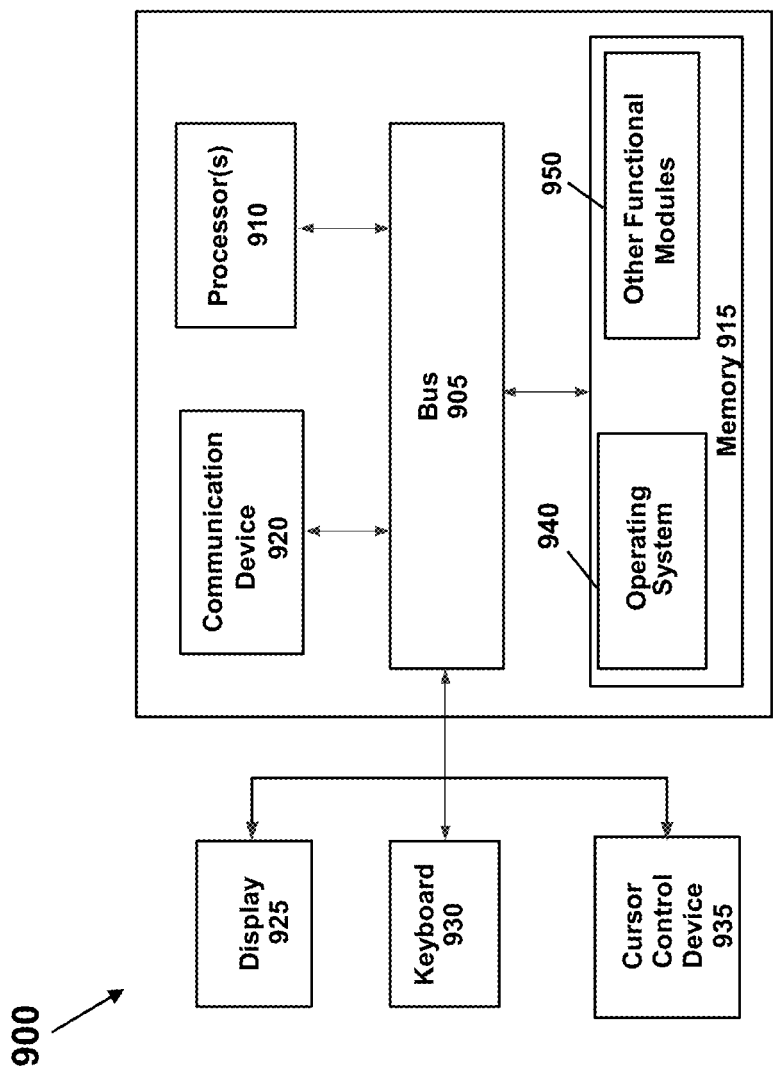
FIG. 9 is a block diagram of a computing system according to an embodiment of the invention.

FIG. 9 is a block diagram illustrating a computing system 900 configured to execute the method described in reference to FIG. 5, according to an embodiment of the present invention. In some embodiments, computing system 900 may be one or more of the computing systems depicted and/or described herein. Computing system 900 includes a bus 905 or other communication mechanism for communicating information, and processor(s) 910 coupled to bus 905 for processing information. Processor(s) 910 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 910 may also have multiple processing cores, and at least some of the cores may be configured to perform specific functions. Multi-parallel processing may be used in some embodiments.

Computing system 900 further includes a memory 915 for storing information and instructions to be executed by processor(s) 910. Memory 915 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 910 and may include volatile media, non-volatile media, or both. The media may also be removable, non-removable, or both.

Additionally, computing system 900 includes a communication device 920, such as a transceiver, to provide access to a communications network via a wireless and/or wired connection according to any currently existing or future-implemented communications standard and/or protocol.

Processor(s) 910 are further coupled via bus 905 to a display 925 that is suitable for displaying information to a user. Display 925 may also be configured as a touch display and/or any suitable haptic I/O device.

A keyboard 930 and a cursor control device 935, such as a computer mouse, a touchpad, etc., are further coupled to bus 905 to enable a user to interface with computing system. However, in certain embodiments, a physical keyboard and mouse may not be present, and the user may interact with the device solely through display 925 and/or a touchpad (not shown). Any type and combination of input devices may be used as a matter of design choice. In certain embodiments, no physical input device and/or display is present. For instance, the user may interact with computing system 900 remotely via another computing system in communication therewith, or computing system 900 may operate autonomously.

Memory 915 stores software modules that provide functionality when executed by processor(s) 910. The modules include an operating system 940 for computing system 900 and one or more additional functional modules 950 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method for providing assistance to a user managing a communication session in a contact center system, the contact center system including a plurality of applications, the computer-implemented method comprising:
    executing one or more robotic process automation (RPA) workflows to search the plurality of applications for information relevant to the communication session;
    presenting, based on the relevant information, at least one callout activity configured to prompt the user to perform a recommended action selectable for execution by the user; and
    in response to input by the user selecting the recommended action, executing the recommended action using one or more RPA robots.

2. The computer-implemented method of claim 1, wherein executing one or more robotic process automation (RPA) workflows to search the plurality of applications for information relevant to the communication session comprises:
    executing the one or more RPA workflows by one or more attended RPA robots.

3. The computer-implemented method of claim 1, wherein executing one or more robotic process automation (RPA) workflows to search the plurality of applications for information relevant to the communication session comprises:
    executing the one or more RPA workflows by one or more unattended RPA robots.

4. The computer-implemented method of claim 1, wherein the at least one callout activity is generated based on the relevant information.

5. The computer-implemented method of claim 1, wherein the at least one callout activity is generated based on an activity associated with the communication session.

6. The computer-implemented method of claim 1, wherein the at least one callout activity is further configured to prompt the user with a contextual instruction for a next action to be taken by the user.

7. The computer-implemented method of claim 1, wherein the at least one callout activity is further configured to prompt the user with a message confirming completion of one or more actions.

8. The computer-implemented method of claim 1, wherein presenting, based on the relevant information, at least one callout activity configured to prompt the user to perform a recommended action selectable for execution by the user comprises:
    sequentially presenting a plurality of callout activities configured to perform a series of related actions associated with a process.

9. The computer-implemented method of claim 1, wherein the executing the one or more RPA workflows, the presenting, and the executing the recommended action are performed by one or more computing devices implemented in a cloud computing system.

10. A system for providing assistance to a user managing a communication session in a contact center system, the contact center system including a plurality of applications, the system comprising:
    a memory storing computer program instructions; and
    at least one processor configured to execute the computer program instructions, the computer program instructions configured to cause the at least one processor to perform operations of:
        executing one or more robotic process automation (RPA) workflows to search the plurality of applications for information relevant to the communication session;
        presenting, based on the relevant information, at least one callout activity configured to prompt the user to perform a recommended action selectable for execution by the user; and
        in response to input by the user selecting the recommended action, executing the recommended action using one or more RPA robots.

11. The system of claim 10, wherein executing one or more robotic process automation (RPA) workflows to search the plurality of applications for information relevant to the communication session comprises:
    executing the one or more RPA workflows by one or more attended RPA robots.

12. The system of claim 10, wherein executing one or more robotic process automation (RPA) workflows to search the plurality of applications for information relevant to the communication session comprises:
    executing the one or more RPA workflows by one or more unattended RPA robots.

13. The system of claim 10, wherein the at least one callout activity is generated based on the relevant information.

14. The system of claim 10, wherein the system is implemented in a cloud computing system.

15. A non-transitory computer readable medium storing computer program instructions for providing assistance to a user managing a communication session in a contact center system, the contact center system including a plurality of applications, the computer program instructions when executed by one or more processors cause the one or more processors to perform operations comprising:
    executing one or more robotic process automation (RPA) workflows to search the plurality of applications for information relevant to the communication session;
    presenting, based on the relevant information, at least one callout activity configured to prompt the user to perform a recommended action selectable for execution by the user; and
    in response to input by the user selecting the recommended action, executing the recommended action using one or more RPA robots.

16. The non-transitory computer readable medium of claim 15, wherein the at least one callout activity is generated based on an activity associated with the communication session.

17. The non-transitory computer readable medium of claim 15, wherein the at least one callout activity is further configured to prompt the user with a contextual instruction for a next action to be taken by the user.

18. The non-transitory computer readable medium of claim 15, wherein the at least one callout activity is further configured to prompt the user with a message confirming completion of one or more actions.

19. The non-transitory computer readable medium of claim 15, wherein presenting, based on the relevant information, at least one callout activity configured to prompt the user to perform a recommended action selectable for execution by the user comprises:
    sequentially presenting a plurality of callout activities configured to perform a series of related actions associated with a process.

20. The non-transitory computer readable medium of claim 15, wherein the one or more processors are implemented in one or more computing devices and the one or more computing devices are implemented in a cloud computing system.

* * * * *